Aug. 16, 1960 F. B. DOEMER 2,949,049
INDEX TABLE
Filed Nov. 1, 1956 8 Sheets-Sheet 1

Fig. 1

Frank B. Doemer
INVENTOR.

BY
Attorneys

Aug. 16, 1960 F. B. DOEMER 2,949,049
INDEX TABLE
Filed Nov. 1, 1956 8 Sheets-Sheet 2

Frank B. Doemer
INVENTOR.

BY
Attorneys

Frank B. Doemer
INVENTOR.

Aug. 16, 1960    F. B. DOEMER    2,949,049
INDEX TABLE

Filed Nov. 1, 1956    8 Sheets-Sheet 6

Frank B. Doemer
INVENTOR.

BY
Attorneys

Aug. 16, 1960 F. B. DOEMER 2,949,049
INDEX TABLE
Filed Nov. 1, 1956 8 Sheets-Sheet 7

Frank B. Doemer
INVENTOR.

Aug. 16, 1960   F. B. DOEMER   2,949,049
INDEX TABLE
Filed Nov. 1, 1956   8 Sheets-Sheet 8

Fig. 16

Frank B. Doemer
INVENTOR.

United States Patent Office 2,949,049
Patented Aug. 16, 1960

2,949,049

INDEX TABLE

Frank B. Doemer, 4139 Samoset, Royal Oak, Mich.

Filed Nov. 1, 1956, Ser. No. 619,705

8 Claims. (Cl. 74—822)

This invention generally relates to a device for indexing or positioning work on a machine and more particularly relates to an index table which may be placed on a standard or special machine that has automatic feed and which may be used for drilling, milling, honing, broaching, grinding or other machining operations where high production and accuracy are required in the parts being manufactured.

An object of the present invention is to provide an index table incorporating a construction which will positively lock the index table with the tooling mounted therein in a desired position during the machining operation, wherein the operation of the positive lock means will energize the automatic operation of the machine for a predetermined time interval, after which the index table will again be operated, thus rendering the machining operation completely automatic.

Another object of the present invention is to provide an index table which may be indexed at a plurality of points by controlling the stroke of index cylinder of interchanging the index plate.

A further object of the present invention is to provide an index table which is extremely compact in construction and incorporates a combined hydraulic and electric system for automatically controlling operation of the index table and the machine and interlocking the index table at a predetermined position and in line with the machine or tool motion in order that the complete machining or work on the manufactured articles will be completely automatic and the indexing of the articles in proper relationship to the working tool will be automatic and in the proper timed relationship to the operation of the machine.

Other features of the present invention will reside in its compact arrangement, a construction which incorporates a linkage for imparting a relatively large movement of the index table by a relatively small movement of an actuating piston, versatility in use, adaptability for various installations and arrangements, and its relative simplicity of construction.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
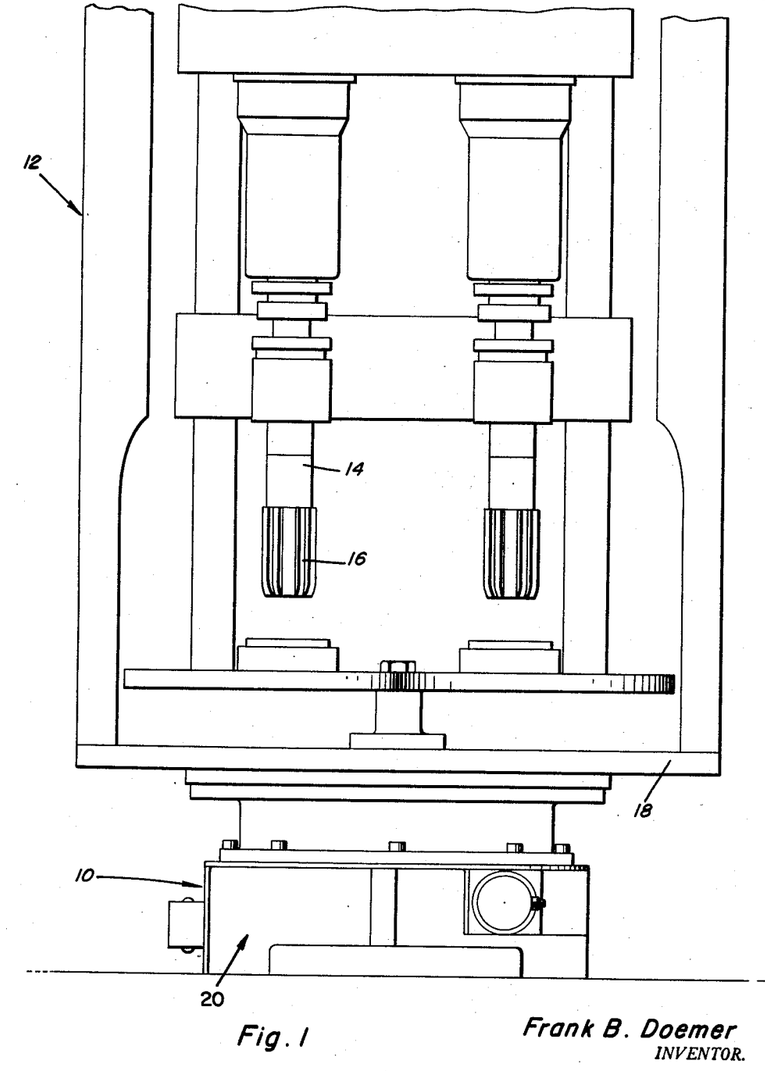
Figure 1 is an elevation view of the index table of the present invention incorporated with a honing machine.

Referring now specifically to Figure 1 of the drawings, the index table which forms the present invention is generally designated by the numeral 10 and is illustrated as being employed in combination with a honing machine generally designated by the numeral 12 which in this particular instance includes a pair of vertical spindles 14 having the tools 16 on the lower ends thereof for engagement with manufactured articles which are tooled on the member 18, and it is pointed out that various arrangements may be employed for rigidly holding the articles to be manufactured and all of the particular construction of the machine employed with the index table 10 represents no part of the present invention except in its relationship to the index table and the interlocking automatic controls for automatically energizing or starting the machine after the index table 10 has properly indexed the articles in relation to the tools 16, thus accurately positioning the articles to be engaged by the tools 16. The details of the index table 10 will be described and the schematic hook-up and interlocking relationship with the machine will also be described and the illustration of the device with a honing machine is not to be construed as limiting the scope of the present invention, since it may be employed with various types of automatic machines which are employed for drilling, milling, grinding, honing and other similar standardized machine operations.

Figure 2:
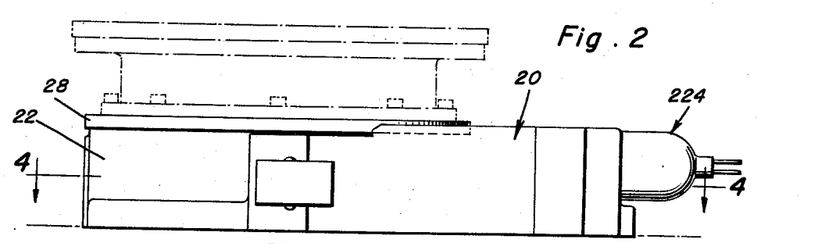
Figure 2 is an elevation view of the index table of the present invention.
Figure 3:
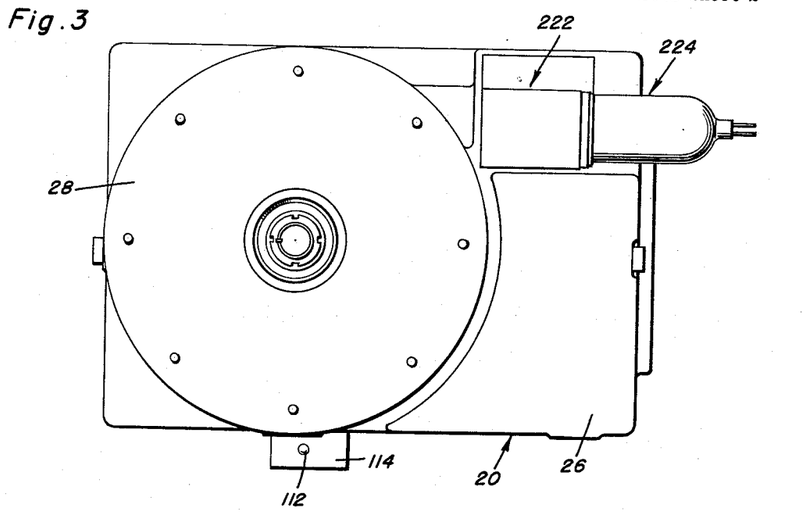
Figure 3 is a plan view of the index table.
Figure 6:
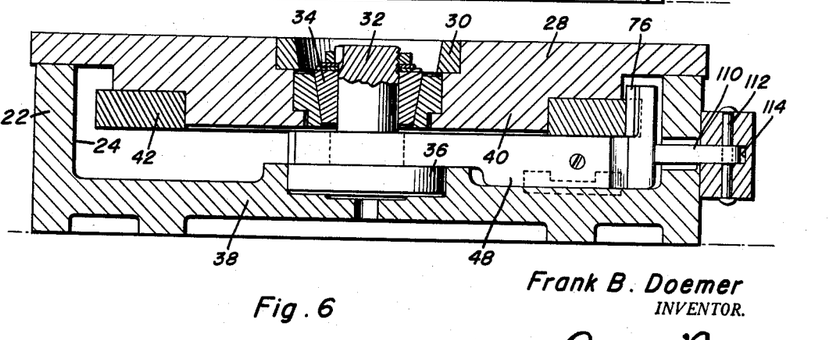
Figure 6 is a transverse, vertical sectional view taken substantially upon a plane passing along section line 6—6 of Figure 4.

Reference is now made to Figures 2 and 3 in which the numeral 20 generally designates a base casting which is substantially rectangular in outline and which includes an enlarged cylindrical portion 22 at one end thereof which defines an enlarged opening or vacant area 24 for receiving a mechanism described hereinafter. A cover plate 26 is provided at one end of the casting, which protects a precision ground surface for the device and a circular top plate 28 is disposed in overlying relation to the enlarged opening 24 and generally is disposed at the upper end of the cylindrical portion 22. As seen in Figure 6, the outer periphery of the plate 28 barely projects beyond the cylindrical portion 22 and is disposed closely adjacent the upper surface or upper edge of the cylindrical portion 22 of the base 20.

The rotary top or plate 28 has a taper adapter 30 in the center thereof for interchangeability of the tooling disposed thereon for adapting the unit to use with various parts and machines.

The plate 28 is mounted on a central post 32 and is accurately positioned thereon relative to the centerline by a bronze taper split brushing 34 which will retain the concentricity within the limits of accuracy required in construction of an index table of this nature. The center post 32 is mounted rigid and fixedly disposed in the bottom of the sub-base casting 20. Also, the top plate or index plate 28 is provided with a central depending cylindrical portion 40 which projects downwardly into the interior of the cavity formed by the cylindrical portion 22 and is provided with an annular index ring 42 having inwardly extending notches 44 disposed therein. The notches 44 may be disposed in peripheral spaced relation and the number of notches on the ring 42 is dependent upon the number of index points or stations in the particular setup, or a plate may be provided to change index positions. The index plate 28 may be removed and replaced with another plate having a different ring 42 thereon, and it is conceivable that the ring 42 may itself be replaced with a different ring, thus altering the number of notches 44 therein and also altering the index points.

Mounted on the center post 32, which is provided with a longitudinal passageway 46 for receiving fluid, is an index arm designated by the numeral 48. It is pointed out that the vertical tubular passageway 46 in the post 32 is communicated with a radial passageway 50, which in turn comunicates with an annular passageway 54 that discharges fluid into an elongated tubular passage 56 in the index arm 48 and the passageway 56 extends towards the free end of the arm 48 and is provided with a plug 58 at the end thereof adjacent the post 32 and is communicated with a perpendicularly arranged passage 60 having a plug 62 therein, with the inner end of the passage 60 being communicated with a longitudinally extending bore 64 of a generally enlarged cross section and which includes a reduced inner end portion 66 with a compression coil spring 68 disposed therein for engagement with one end of a piston assembly generally designated by the numeral 70 that is provided with a press fitted, upstanding member 72 on the free end thereof which is disposed between the nose pieces 74 on the index arm 48, thus forming a guide for inward and outward sliding movement of the upstanding member 72 that has an inwardly extending projection 76 which is substantially the same shape and size as the notch 44, thus being closely received in the notch 44 and securely locking the index arm 48 with the index plate 28, so that the index plate 28 will be caused to rotate with the index arm 48. The relationship of the center post 32 and the index arm 48 is illustrated in Figures 7 and 9 and also generally in Figure 6.

Figure 7:
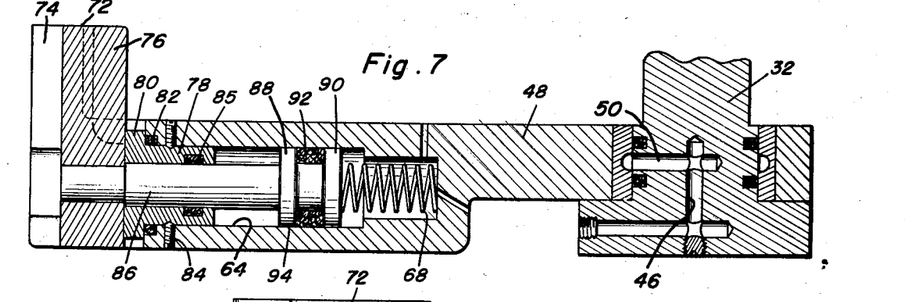
Figure 7 is a longitudinal, sectional view taken substantially upon a plane passing along section line 7—7 of Figure 4 illustrating the details of the index arm.
Figure 8:
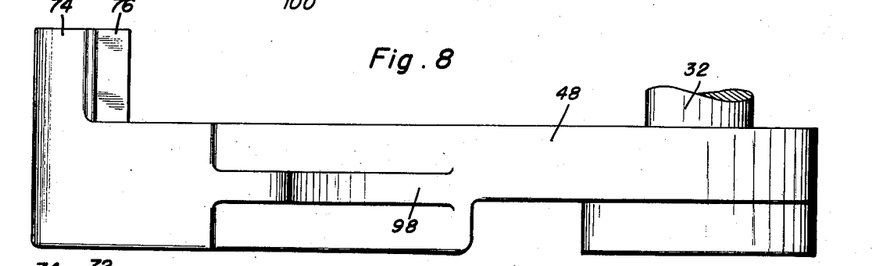
Figure 8 is a detailed side elevational view of the index arm.
Figure 9:
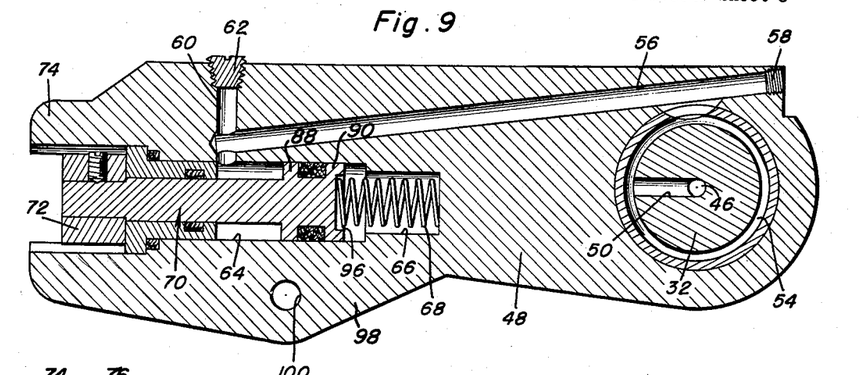
Figure 9 is a plan sectional view of the index arm.
Figure 10:
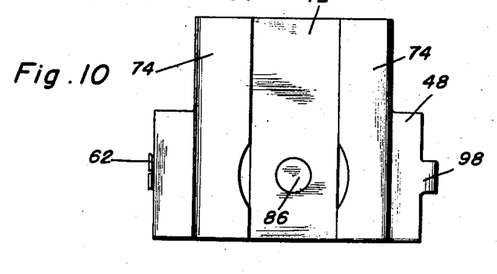
Figure 10 is an elevational end view of the outer end of the index arm.

Referring specifically now to Figures 7 and 9, it is pointed out that the outer end of the bore or cylinder 64 is provided with a plug 78 having a flange 80 engaging the outer end of the arm 48 between the nose pieces or fingers 74 which form a bifurcated end portion and a seal ring 82 is provided at the juncture of the flange and cylindrical portion of the hollow plug 78 for effectively sealing the plug 78 to the portion of the arm 48 which encircles the cylinder 64. The plug 78 is retained in position by removable radial set screws 84. An annular seal ring 85 is disposed in the plug 78 for engagement with the rod 86 of the piston generally designated by the numeral 70, thus sealing the plug 78 to the piston rod 86.

The piston assembly 70 also includes spaced flanges 88 and 90, with flange 90 being at the inner end of the rod 86 and the flange 88 spaced outwardly therefrom and being equal in diameter to the cylinder 64 and a seal ring 92 is provided against the outer surface of the rod 86 and in engagement with the cylinder 64. The end of the rod 86 having the flange 90 thereon is provided with a recess 96 receiving the outer end of the compression coil spring 68, thus centering the spring 68 and orientating the same in proper position. When fluid pressure is admitted into the cylinder 64 through the passageways 46, 54, 56 and 60, the piston assembly 70 will be urged to the right in Figure 9, thus compressing spring 68 and engaging the projection 76 with the notch 44 and retaining this engagement as long as pressure is applied to the piston formed by the flanges 88, 90 and the ring member 92. When pressure is released, the compressed spring 68 will urge the piston assembly outwardly and to the left in the index arm 48, thus releasing the projection 76 on the upstanding member 72 on the outer end of the piston assembly 70 from the notch 44, thus disengaging the index arm and unlocking the index arm from the index plate 28 for permitting the index arm 48 to return for the next indexing operation.

Figure 4:
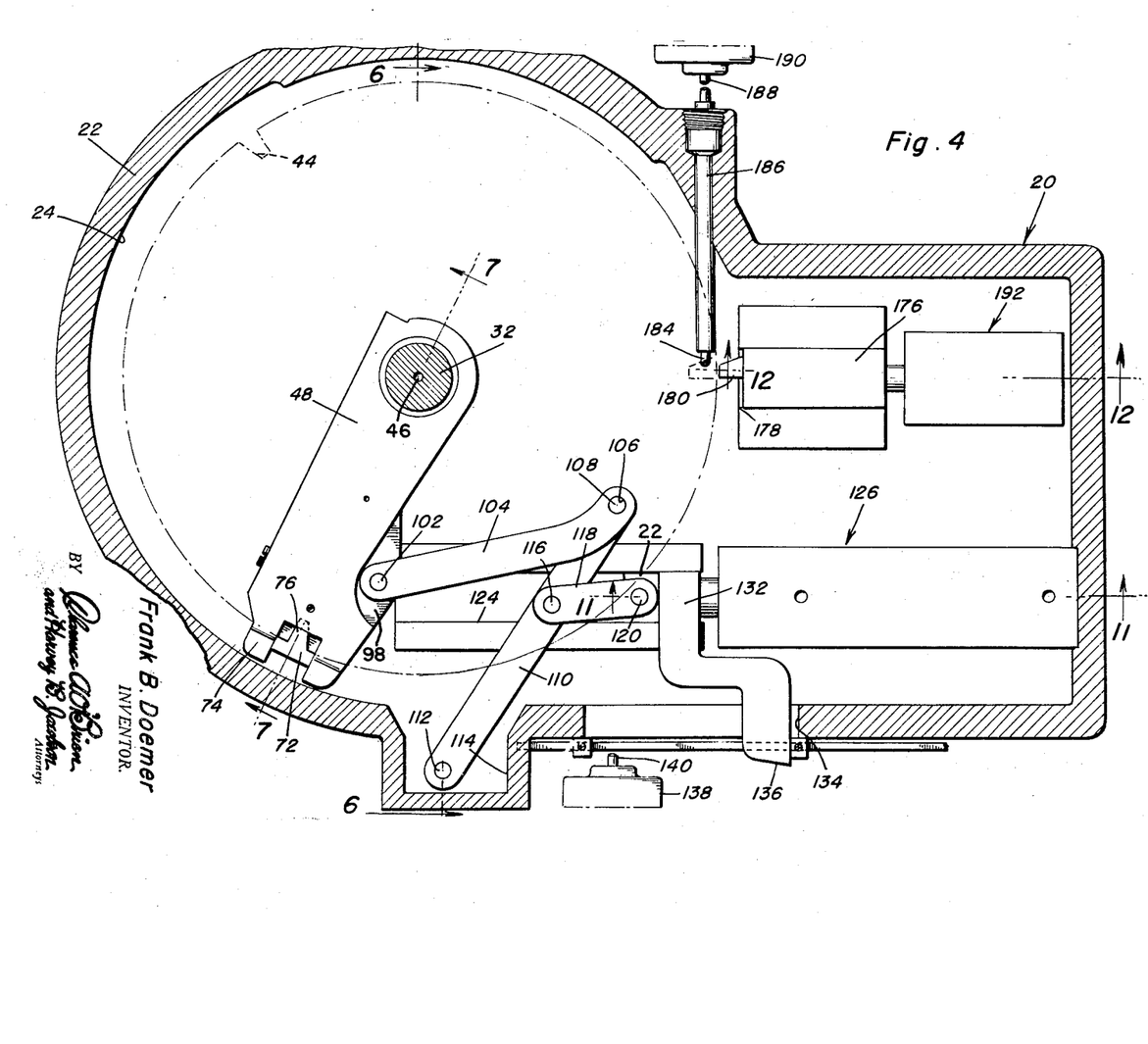
Figure 4 is a sectional view taken substantially upon a plane passing along section line 4—4 of Figure 2 illustrating the initial position of the index arm.
Figure 5:
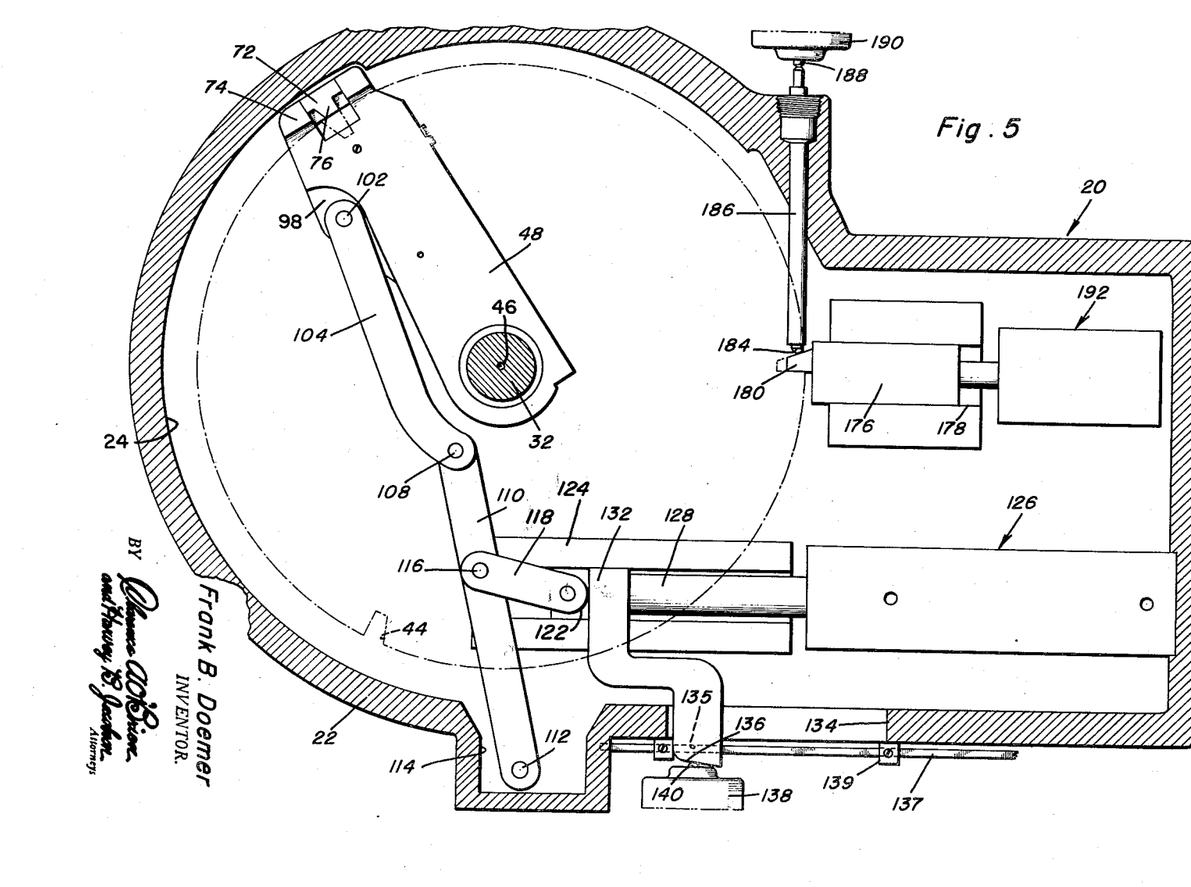
Figure 5 is a sectional view similar to Figure 4 but illustrating the index arm in extended position and illustrating the details of the linkage interconnecting the actuating piston and index arm.
Figure 11:
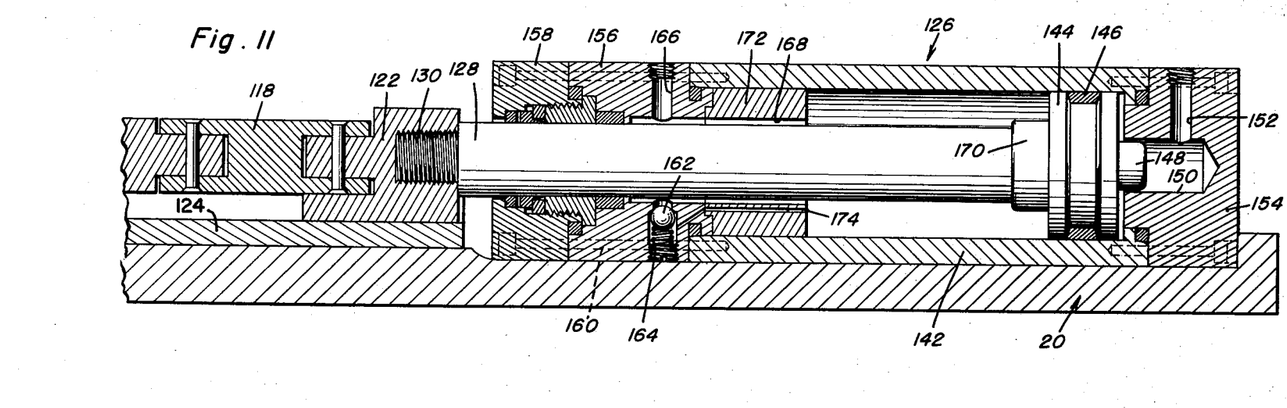
Figure 11 is a longitudinal sectional view taken substantially upon a plane passing along section line 11—11 of Figure 4 illustrating the construction of the actuating piston and cylinder arrangement for the index arm.

One side of the indexing arm 48 is provided with a horizontally disposed lug portion 98 having an aperture 100 therethrough for receiving a pivot pin 102 on the end of an H-shaped link 104 as illustrated in Figures 4 and 5. The H-shaped link 104 is substantially straight, with the end thereof remote from pin 102 being curved toward the center post 32 and provided with aligned apertures 106 for receiving a connecting pin 108 that connects the H-shaped link 104 to a bar type lever 110 that has the terminal or free end thereof connected to a pin 112 disposed in a recess 114 in the cylindrical portion 22 of the base casting 20. The bar lever 110 is straight and is received between the bifurcated end of the H-shaped link 104. Intermediate the ends of the lever 110 is a connecting pin 116 for connecting the lever 110 to the outer end of an H-shaped link 118 which has the other end thereof pivotally attached to a connecting pin 120 extending through a cross-head adapter 122, substantially as illustrated in Figure 11, wherein the cross-head adapter 122 is slidable in a longitudinal guideway generally designated by the numeral 124. The cross-head adapter 122 is operated by a hydraulically controlled piston and cylinder arrangement generally designated by the numeral 126 which incorporates a piston rod 128 having a screw threaded or pin type connection 130 with the cross-head adapter 122.

The cross-head adapter 122 is provided with an outwardly extending arm 132 which projects through a slot 134 in the base casting 20 and is provided with a square hole 135 in the outer end for control of the stroke of the cylinder by means of adjustable stops and also for actuation of switch 138 having a plunger or push button 140 in the path of movement of an adjustable dog at 136, wherein the adjustable dog on 136 will depress the push button 140 when the piston rod 128 is moved outwardly in relation to the piston and cylinder arrangement 126. It is pointed out that the switch 138 may be adjusted in any relationship to the arm 132, or the dog on 136, thus determining the scope of movement of the piston rod 128 before the switch 138 is activated. Also, it is pointed out that the particular shape of the arm 132 may be altered as desired in order that the stops and switch energizing dogs may energize the switch at the proper point. It is also conceived that the cross-head adapter 122 could actually be provided with a cam surface in engagement with the switch plunger, thus permitting the switch 138 to be mounted inside of the base casting 20, if such an arrangement is desired.

As illustrated in Figures 4 and 5 of the drawings, relatively short movement of the piston rod 128 will cause a relatively larger scope of movement of the index plate 28 due to the linkage mechanism formed by link 118, lever 110 and link 104. This permits a relatively short stroke piston and cylinder arrangement 126 to be disposed within the base casting, but still provides the necessary rotational movement of the index plate 28.

The particular details of the piston and cylinder arrangement 126 may be varied, but for the purposes of illustration this includes a central cylindrical barrel or housing 142 slidably receiving the piston 144 on the inner end of piston rod 128, with the piston 144 having the usual seal ring 146. The piston 144 is provided with a longitudinal projection 148 extending in a longitudinal passageway 150 which is in communication with a fluid pressure inlet passage 152. The end of the barrel 142 is provided with a removable adapter 154 having the passageways 150 and 152 therein and also a pair of segmental members 156 and 158 at the other end thereof, all of which are retained in position by longitudinal fastening bolts 160. Proper sealing rings, gaskets, replaceable bearing elements and other features necessary for accurate control of the piston rod 128 are incorporated in the piston and cylinder arrangement, as is a cushion in the form of a metering screw (not shown). 162 is a check which provides for quick return of the piston 144 during its working stroke. The spring urged ball valve 162 is disposed in the passageway 164 diametrically opposed to a passageway 166 which is in communication with a longitudinal bore 168 receiving the piston rod 128 in spaced relation thereto for exhausting fluid from behind the piston 144 when the piston 144 is moved to the left during the working stroke and for admitting pressurized fluid against the inner surface of the piston 144 during the return stroke when the index arm is returned to a normal position. The piston rod 128 is provided with an enlarged cylindrical portion 170 adjacent the piston 144 for being closely received in the bore 168, thus forming a hydraulic cushion for the piston 144 and preventing the piston 144 from engaging the insert 172 in the barrel 142. A passageway 174 intercommunicates the bore 164 with the interior of the barrel adjacent the inner surface of the piston 144 when it is at its innermost end or at the end of its working stroke, whereby pressurized fluid admitted into the bore 168 will not only act on the end of the enlarged portion 170, but will also proceed through the spring check valve 162 and passageway 174 for acting on the relatively larger area of the piston 144, thus assuring operation of the piston and cylinder arrangement 126.

Disposed arcuately remotely from the normal position of the index arm 48 is a shot pin 176 slidably disposed in longitudinal guide block 178, with the shot pin 176 being provided with a removable nose piece 180 held in position by fasteners 182 and used to actuate switch 190 (see Figure 16), with 180 being substantially identical in shape to the notch 44 in the index plate 28 and extending in a sufficient vertical direction to simultaneously engage a notch 44 and also engage cam 180 with one end of the actuating rod 184 disposed in tubular member 186, with the other end of the actuating rod 184 being disposed for operating a plunger or push button 188 of a microswitch 190 which is generally the same type of switch as designated by numeral 138.

The shot pin 176 acts as a locking device for rigidly engaging the nose piece with the notch 44, thus positively locking the index plate 28 in angular or indexed position. The shot pin 176 is operated by a piston and cylinder arrangement generally designated by the numeral 192.

Figure 12:
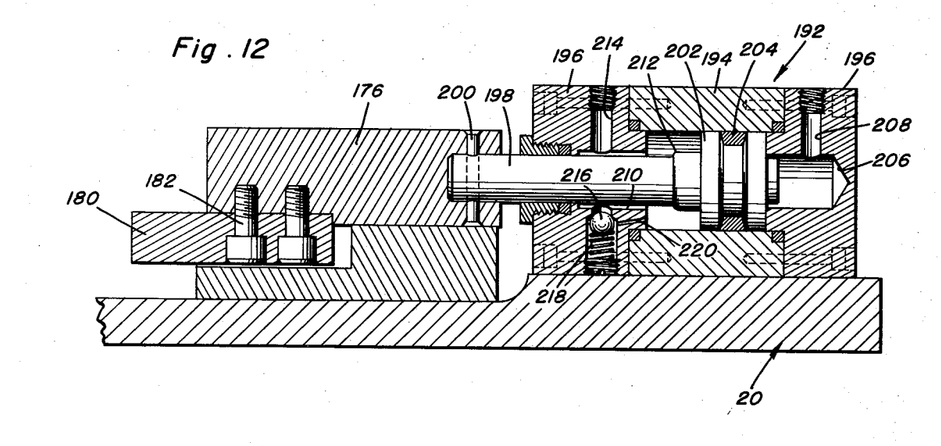
Figure 12 is a longitudinal, vertical sectional view taken substantially upon a plane passing along section line 12—12 of Figure 4 illustrating the piston and cylinder arrangement for actuating the shot pin.

The details of construction of the piston and cylinder arrangement 192 are shown in Figure 12 of the drawings and this piston and cylinder arrangement is quite similar to the piston and cylinder arrangement in Figure 11 designated by numeral 126, except that it is of a reduced size, having a smaller scope of movement. Generally, the piston and cylinder arrangement includes a central barrel 194 having removable end members 196, with one of the end members 196 slidably receiving a piston rod 198 pinned to the shot pin 196 by transverse pin 200. The piston rod 198 is provided with a piston 202 with the usual annular sealing ring 204 therein and one of the block members 196 is provided with a longitudinal passage 206 communicating with a radial passage 208 for admitting and exhausting hydraulic fluid to the face of the piston 202. The other member 196 is provided with a longitudinal bore 210 receiving an enlarged portion 212 on the piston rod 198, and a lateral bore or passageway 214 is provided for admitting and exhausting fluid from the inner surface of the piston 202. The spring urged ball check valve 216 is disposed in a lateral bore 218 in diametric opposition to the bore 214 and a passageway 220 interconnects the bore 218 and the interior of the barrel 194, thus assisting in returning the piston 202 to the right for a working cycle. This arrangement provides a cushion for the inward movement of the shot pin 196, and the other details, such as the various seals, packing nuts and the like, are provided for retaining the device in accurate operating order, inasmuch as the tapered nose piece 180 must be rigidly engaged with the notch 44 in the index plate 28, thus rigidly securing the index plate in its index position. When the index plate is securely locked by the nose piece 180 on the shot pin 176, the switch 190 has been activated, and this switch is connected with the automatic machine for energizing the same in a manner described hereinafter, thus assuring that the machine will not start its operation until such time as the index table has been properly orientated and is rigidly held in the proper position by the nose piece 180 on the shot pin 176.

Figure 13:
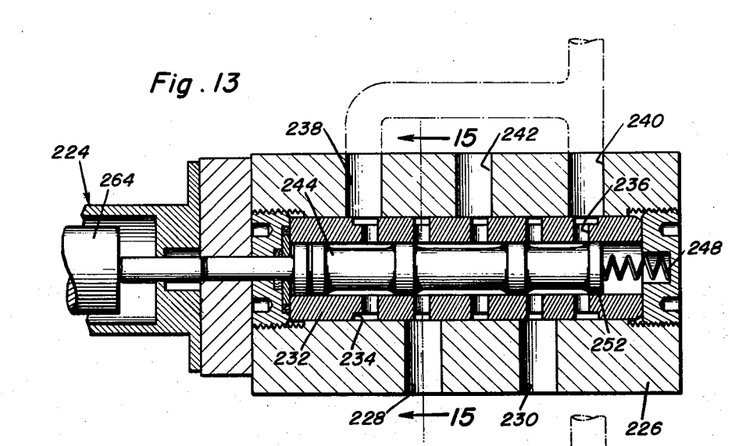
Figure 13 is a detailed sectional view taken longitudinally through the four-way control valve, showing the valve in one position.
Figure 14:
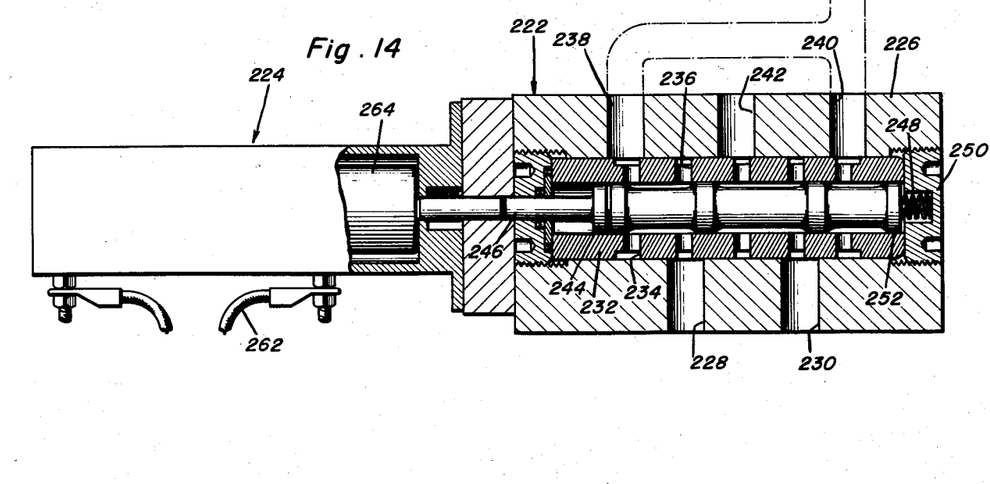
Figure 14 is a sectional view similar to Figure 13 and illustrating the four-way control valve in another position.
Figure 15:
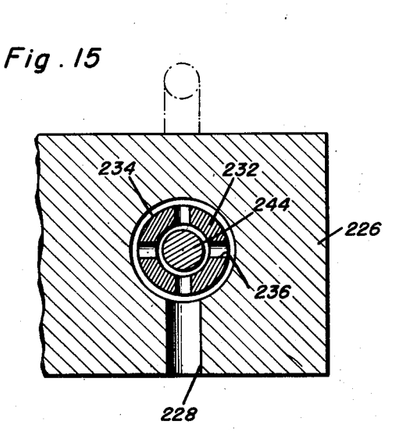
Figure 15 is a transverse, sectional view taken substantially upon a plane passing along section line 15—15 of Figure 13 illustrating the details of construction of the control valve.

Operation of the piston and cylinder arrangements 126 and 192 is controlled by a four-way valve generally designated by the numeral 222 and which is specifically shown in Figures 13–15. The four-way control valve is operated by a solenoid mechanism generally designated by numeral 224 and is spring returned.

The four-way valve 222 includes a generally cylindrical body 226 having a pair of outlet openings 228 and 230 communicating with a cylindrical valve seat 232 in the interior of the cylindrical member 226 which has a plurality of circumferential grooves 234 disposed therein which are five in number, with each of the grooves 234 having four radial passages 236 communicating therewith. The outlet openings 228 and 230 are communicated with the second and fourth grooves 234. A pair of exhaust passages 238 and 240 are communicated with the first and fifth grooves 234, while an inlet opening 242 is communicated with the third or central groove 234. A longitudinally extending valve member or spool 244 is slidably disposed in the cylindrical valve sleeve 232 and the valve member 244 is provided with a stem 246 extending longitudinally through one end of the casing 226 for actuation thereof against a compression coil spring 248 which is interposed between the other end of the valve member 244 and a removable closure plug 250 in the casing 226.

The valve member 244 is provided with four spaced peripheral flanges 252 which are spaced in such a manner that the passages 238 and 240 are selectively communicated with the outlet passages 228 and 230 and the inlet passage 242 is selectively communicated with the outlet passages 228 and 230. In the position illustrated in Figure 13, pressurized fluid is admitted through inlet passageway 242 and will proceed around the valve member by entering through groove 234, then into the interior of the valve sleeve 232 and out through the outlet passage 228. The outlet passage 230 is at this time communicated with the exhaust passage 240, thus permitting inlet of pressure to the passage 230. In the other direction or limit of movement as illustrated in Figure 14, when the spring 248 is compressed, the passage 230 is communicated with the inlet passage 242, while the exhaust passage 238 is communicated with the passage 228 for exhausting the return fluid from this line. Thus, it will be seen that a single supply passage alternatively supplies fluid to one of the outlets 228 or 230, while the outlets 228 and 230 alternately become inlets for the return of liquid from the piston and cylinder arrangements 126 and 192 so that the same may be exhausted through the passages 238 and 240 to a suitable tank which is part of the pump which maintains a substantially constant pressure.

Figure 16:
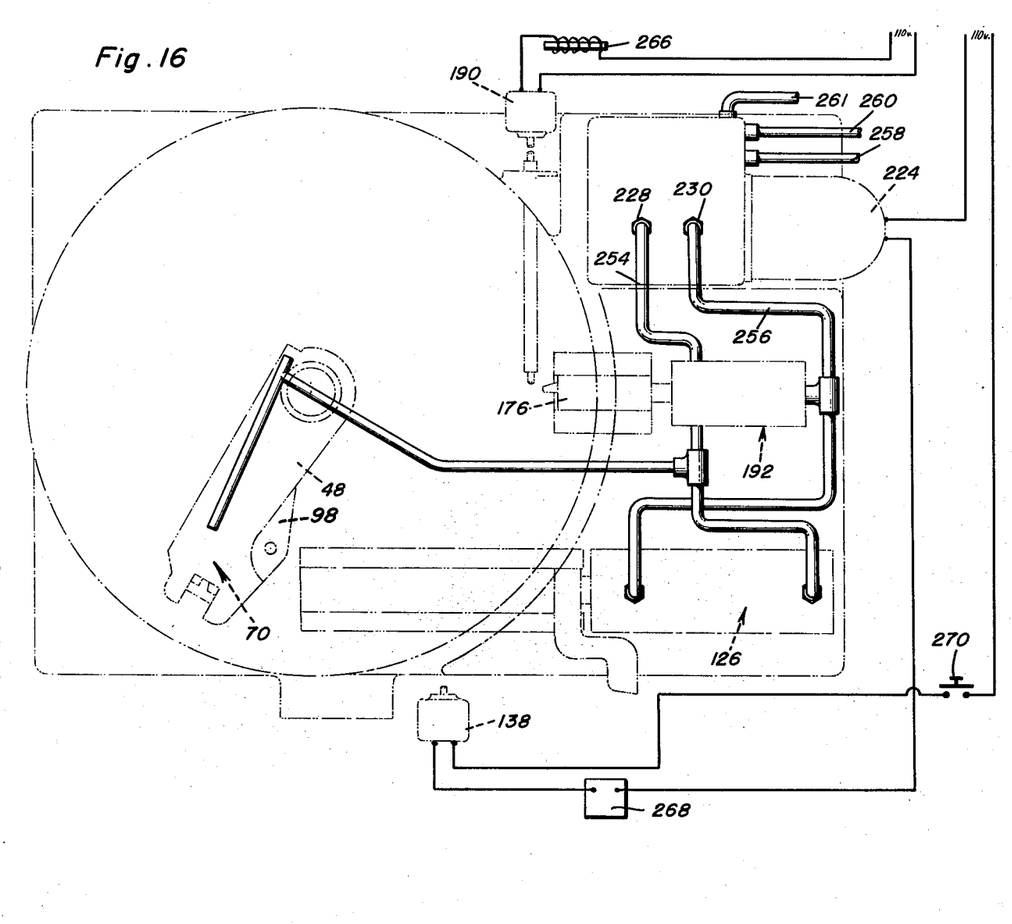
Figure 16 is a schematic plan view illustrating the hydraulic and electric system for automatically controlling the index table and interlocking the same with the automatic machine with which it is associated.

Referring specifically now to Figure 16, it is pointed out that the passage 228 is connected to a conduit 254, while the passage 230 is connected to conduit 256. The exhaust passageways 238 and 240 are connected to conduit 258, while the supply conduit 260 is connected to inlet passageway 242. The conduit 261 is a pressure return line communicated with a pressure relief valve and metering device. The orientation of the passageways and conduits cannot be related in any other manner to the four-way valve 222, but in this manner provides for a compact arrangement. All of the passageways could be on one side of the valve casing or arranged circumferentially in any suitable manner. The arrangement as shown in the drawings is for the purpose of illustration and the various passageways need not be diametrically across from each other. The solenoid mechanism 224 for actuating the four-way valve 222 may be of any suitable construction having electrical wires 262 connected thereto for moving the core 264 in the usual manner. Any suitable conventional type of solenoid may be employed.

The conduit 254 is connected to the passage 214 in the piston and cylinder arrangement 192 and also to the passageway 152 in the piston and cylinder arrangement 126 and also to the fluid line which connects to the passageway in the center post 32 of the index arm 48. The conduit 256 is connected to the passageway 208 in piston and cylinder arrangement 192 and to passageway 166 in the piston and cylinder arrangement 126 as illustrated in Figure 16. Thus, when the actuating piston and cylinder arrangement 126 is moved for rotating the index table 28, the piston and cylinder arrangement 192 for the shot pin 176 will be in a retracted position. When the solenoid is energized for shifting the position of the four-way valve, the fluid will then enter conduit 154 for urging the piston 202 for unlocking the shot pin 176 with the notch 44 in the table 28 and also admit pressurized fluid to the back surface of the piston 144, thus causing the same to move forward for the index. The movement of the four-way valve also communicates the conduit 256 with the return passageway, thus permitting pressure to be exhausted from the piston and cylinder arrangement 192 through the passageway 208, from the passageway 166 of the piston and cylinder arrangement 126, allowing shot pin 176 to retract from plate 28. When the solenoid is de-energized as shown in Figure 13, the oil flows through 230 to 256, 208 interlocking index plate 28, and instantaneously flows to inlet 166 of Figure 11 for complete return of index cylinder 126 and exhaust of line 254 to 228 to the exhaust.

The electrical circuit is arranged so that the power supply through the machine solenoid 266 in Figure 16 is connected through microswitch 190, whereby the solenoid 266 will not be energized until such time as the index table has been properly orientated and locked in position by the shot pin 176, which movement actuates the switch 190. The normally closed switch 138, actuated by the movement of the piston rod 128, is in series with a relay designated by the numeral 268, and a switch 270. The solenoid 224 for operating the four-way valve is also in series with the switch 138, thus assuring the maintenance of the four-way valve in proper position during the operation of the machine. This construction provides that the machine will not be energized until such time as the index plate has been properly positioned and securely locked into position by the shot pin. Simultaneous with this locking action, the machine will begin its operation and continue its operation for a predetermined length of time. Thus, the automatic machine is automatically controlled and interlocked with the index table, so that the index table will not index in its next position until such time as the machine has completed its operation, after which the mechanism for turning the index table is automatically operated and the cycle is repeated.

The switch 270 is manually actuated, which energizes the control circuit for the index table. A simple form of the control circuit is illustrated and may be altered by providing any suitable safety interlocking devices, each of which may be specifically adapted for the particular installation. The switch 270 is closed, thus energizing the circuit to the solenoid 224 on the four-way valve inasmuch as the switch 138 is normally closed and the relay 268 is also in position for completing the circuit. This energizes the solenoid 224 which moves the valve spool longitudinally in such a manner to move the table 28 to an index position. As the solenoid 224 is energized, the four-way valve is moved to compress spring 248 or any other similar spring devices incorporated in connection therewith for admitting pressurized fluid for withdrawing the shot pin 176 and locking the index arm to the table and rotating the table a predetermined amount as determined by the position of the stops associated with the arm 132 or the replaceable cylindrical blocks 172 as shown in Figure 11. By replacing the blocks 172 with longer or shorter elements, the scope of movement of the piston 144 may be adequately adjusted. As an additional check device, the square shaft 137 in the square hole 135 having the stops 139 thereon may be connected to a hydraulic check device (not shown) for limiting the movement of the arm 132 and the piston rod 128, thus effectively cushioning and limiting the movement of the piston rod 128, thus also limiting the scope of movement of the index arm 48. Contact of the dog on the outer end 136 of the arm 132 with the microswitch 138 or any other adjustable dog de-energizes the circuit to the four-way solenoid 224, thus shifting the spool in the four-way valve to its other limit of movement, inasmuch as the compressed spring will move the same longitudinally, thus simultaneously extending the shot pin 176 into locking engagement with the notch and withdrawing the piston 144 and the locking nose piece on the index arm, thus returning the index arm to an initial position for its next indexing action. Movement of the shot pin 176 will cause cam 180 to close switch 190, which in turn energizes solenoid 266 which starts the machine operation. The control relay 268 or other time delay electrical action holds the circuit between start button 270 and limit switch 138 which is closed until arm 132 moves forward for opening switch 138 and relay 268 for de-energizing solenoid 224. The switch 270 is controlled by a relay or any equivalent electrical device (not shown) that is operative in response to the machine operation in such a manner that switch 270 will be automatically closed for again energizing solenoid 224. It enables the machine to complete its operation before the solenoid 224 is again energized. Such a delay mechanism is desirable in order to prevent immediate operation of the next index cycle. After the machine has completed its stage of operation, the index cycle is repeated.

It is pointed out that the various pinned connections in the linkage may be provided with removable pins such as those commonly employed which provide a screw threaded bore in one end thereof for the insertion of a removing tool. Also, the top table 28 and the member 34 may be held in position by a thrust washer, lock washer and lock nut arrangement, together with a key extending longitudinally in the post and lock nut (see Figure 6). Also, the four-way valve may be located remotely from the casting 20 and is provided with an adjustable spring loaded metering ball to maintain a constant pressure regardless of fluctuations in the supply line pressure which may be caused by fluctuations in the pressure relief valve in the supply line and also fluctuations in the pump pressure. This metering device provides a control for the speed of movement of the top plate 28. While the details of the construction for quick return of the pistons 144 and 202 is shown, a metering screw arrangement is provided for cushioning the movement of the pistons 202 and 144.

It is pointed out that all of the elements subject to wear and subsequent inaccuracies are so constructed that they may be replaced or repaired, thus assuring accurate operation of the device at all times and permitting ease of inspection and repair of the various elements thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An index table comprising a base, an index plate rotatably mounted on said base, an index arm swingably mounted on said base and having means on the free end thereof for detachable engagement with the index plate, means for swinging said index arm, means for selectively latching the arm to the plate for movement of the plate with the arm, and means for rigidly locking the index plate in index position in response to movement of the arm swinging means, said means for actuating said index arm including a fluid operated piston and cylinder arrangement, a linkage mechanism interconnecting the piston and cylinder arrangement and the index arm, said linkage mechanism including an arrangement for converting the small scope of movement created by the piston and cylinder arrangement to a large scope of movement of the index plate, thus permitting a compact arrangement of the piston and cylinder arrangement.

2. An index table comprising a base, an index plate rotatably mounted on said base, an index arm swingably mounted on said base and having means on the free end thereof for detachable engagement with the index plate, means for swinging said index arm, means for selectively latching the arm to the plate for movement of the plate with the arm, and means for rigidly locking the index plate in index position in response to movement of the arm swinging means, said means for locking the outer end of the index arm to the index plate including a fluid pressure actuated latch member reciprocably mounted on said index arm, said index plate having a series of radially disposed notches for receiving said latch member and passageways in said arm for selectively communicating the fluid pressure actuating means to a source of fluid pressure.

3. An index table comprising a base, an index plate rotatably mounted on said base, an index arm swingably mounted on said base and having means on the free end thereof for detachable engagement with the index plate, means for swinging said index arm, means for selectively latching the arm to the plate for movement of the plate with the arm, and means for rigidly locking the index plate in index position in response to movement of the arm swinging means, said means for locking the index plate in index position including a shot pin operated by hydraulic piston and cylinder means for rigidly locking the plate in position after actuation of the plate.

4. An index table comprising a support member, a plate rotatably mounted on said support member, means for rotating said plate through a predetermined angle, and means for locking said plate in position, said locking means being actuated in response to movement of the means for rotating said plate, said plate rotating means including a rotatable arm mounted for rotation about the same axis as the plate, means releasably locking said arm to said plate, a linkage mechanism connected to said arm, a fluid pressure actuated piston and cylinder arrangement connected to said linkage mechanism, said linkage mechanism being constructed with a length of movement advantage for multiplying the length of stroke of the piston and cylinder arrangement and applying the increased movement to the plate.

5. The combination of claim 4 wherein said locking means for the plate includes a movable pin, a fluid pressure actuated piston and cylinder arrangement connected to said pin for actuation thereof.

6. The combination of claim 5 wherein said means for locking the arm to the plate includes a movable latch dog, a fluid pressure actuated piston and cylinder arrangement connected to said dog, and control valve means for simultaneously locking the arm to the plate, unlocking the plate to permit rotation thereof, and rotating the plate to an index position, means on the valve means responsive to movement of the plate to index position for shifting the valve means for locking the plate in index position, releasing the plate from the arm, and returning the arm and linkage mechanism to a normal position.

7. The combination of claim 6 wherein said valve means includes a valve solenoid operated in one direction and spring returned, a circuit for operating the solenoid, and a normally closed switch in the circuit with the switch being adjustably positioned for engagement by a portion of the plate rotating means for breaking the circuit and shifting the valve.

8. An indexing device for supporting work comprising a rotatable supporting table, an arm underlying said table and rotatable about the same axis as the table, fluid motor actuated means detachably interlocking the arm and table, fluid motor actuated means for actuating said arm, control valve means for controlling operation of the fluid motor actuated means for locking the arm to the table and rotating the interlocked arm and table, fluid actuated means for locking the table in index position, said control valve means controlling actuation of the table locking means for locking the table when in index position, said table locking means including means responsive to locking and unlocking of the table for closing a control circuit only when the table is locked in index position, said control valve means operating in response to movement of the actuating means for said arm for effecting the locking of the table and simultaneous release of the arm and return of the actuating means to a normal position.

References Cited in the file of this patent

UNITED STATES PATENTS

| | | |
|---|---|---|
| 370,705 | Koch | Sept. 27, 1887 |
| 728,573 | Hanson | May 19, 1903 |
| 921,983 | Hanson | May 18, 1909 |
| 1,578,232 | Ferris | Mar. 23, 1926 |
| 2,380,873 | Schafer et al. | July 31, 1945 |
| 2,400,691 | Grad | May 21, 1946 |
| 2,464,996 | Schafer et al. | Mar. 22, 1949 |
| 2,622,487 | Schultz | Dec. 23, 1952 |
| 2,641,279 | Baldwin | June 9, 1953 |
| 2,645,981 | Hirvonen | July 21, 1953 |
| 2,658,523 | Johnson | Nov. 10, 1953 |
| 2,660,895 | Waters | Dec. 1, 1953 |
| 2,715,944 | Dohrer | Aug. 23, 1955 |
| 2,826,099 | Scholin et al. | Mar. 11, 1958 |

FOREIGN PATENTS

| | | |
|---|---|---|
| 678,022 | Great Britain | Aug. 27, 1952 |